June 20, 1933. W. C. STARKEY ET AL 1,914,678
AUTOMOBILE TRANSMISSION
Filed Feb. 27, 1930
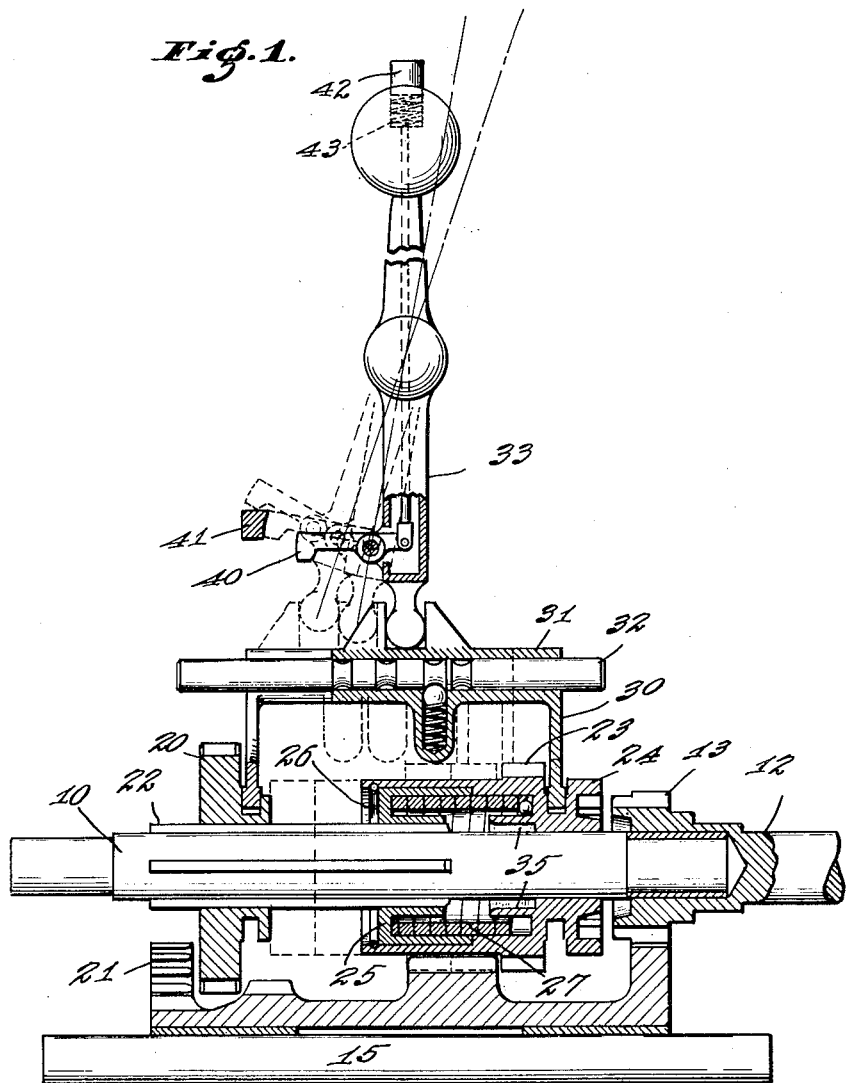
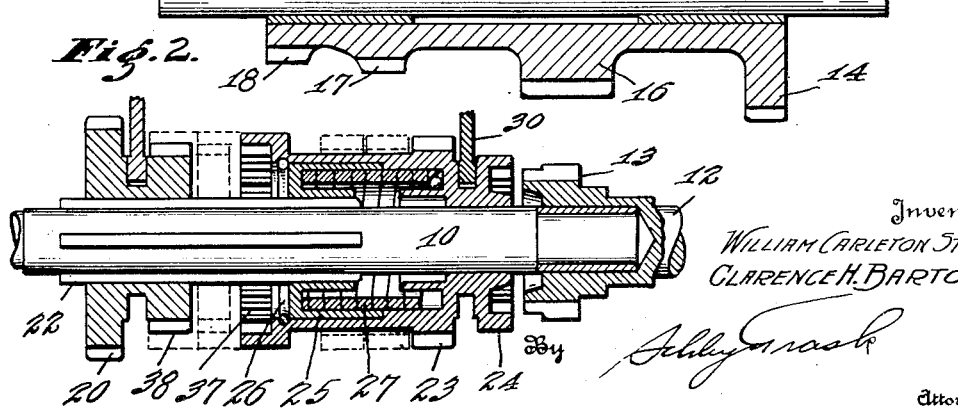
Inventors
WILLIAM CARLETON STARKEY
CLARENCE H. BARTON,
By
Attorneys Patented June 20, 1933

1,914,678

UNITED STATES PATENT OFFICE

WILLIAM CARLETON STARKEY AND CLARENCE H. BARTON, OF INDIANAPOLIS, INDIANA, ASSIGNORS TO L. G. S. DEVICES CORPORATION, OF INDIANAPOLIS, INDIANA, A CORPORATION OF INDIANA

AUTOMOBILE TRANSMISSION

Application filed February 27, 1930. Serial No. 431,924.

Our invention is concerned with free-wheel devices, or devices which when incorporated in the power-transmitting mechanism of an automobile will normally operate to prevent the engine from acting as a brake should it tend to rotate at a speed less than that corresponding to the speed of the automobile. Devices for this general purpose have been in use prior to our invention, but have been open to certain objections which it is the object of our invention to overcome.

When free wheel devices have been used in the past, it has been customary to locate them between the transmission and the drive wheels, and it therefore became necessary to provide some means for locking the free wheel device out of action when it was desired to drive the automobile in reverse direction. Further, it has been appreciated that under certain circumstances a driver might desire to lock the free-wheel device out of action when driving forward in order to use the engine as a brake, and provisions for accomplishing this result have been proposed. All such provisions of which we are aware were of a relatively complicated nature and required extensive changes in the construction of the power-transmitting mechanism of the automobile.

We propose to overcome these objections to prior art devices by incorporation the free-wheel device or overrunning clutch in the transmission and by arranging it so that it will not form a part of the power-transmitting mechanism when the transmission is set to provide a reverse drive. In the ordinary three-speed transmission, we prefer also that the overrunning clutch will not form a part of the power-transmitting mechanism when the transmission is set to provide a low-speed drive. We accomplish this readily by arranging the free-wheel device so that, in a three-speed transmission, it is operative only in high-speed and second-speed, and we provide means whereby the free-wheel device may, at the will of the driver, be locked out of action in second-speed, as it is in second-speed that the engine is usually used as a brake.

The accompanying drawing illustrates our invention: Fig. 1 is a longitudinal section through an automobile transmission embodying our invention; and Fig. 2 is a similar, although fragmental, section illustrating a modification of our invention.

The transmission illustrated in the drawing is of the conventional three-speed type; and embodies a main shaft 10 and a countershaft 11 which are rotatably supported on parallel axes. Co-axial with the main shaft 10, there is a drive or clutch shaft 12 which, in the usual manner, is driven from the automobile engine through a releasable friction clutch. It will be understood that the end of the main shaft, at the end opposite the clutch shaft 12, will be connected in the customary manner through the propeller shaft to the drive wheels of the automobile, and that the transmission will be enclosed in a suitable casing.

At its end adjacent the main shaft 10, the clutch shaft is provided with a pinion 13, which, through a gear 14, drives the countershaft 11. The countershaft 11 may be rotatably mounted upon a spindle 15 and has rigid with it a second-speed gear 16, a low-speed gear 17, and a reverse gear 18.

Slidably mounted upon but rotatable with the main shaft 10 is a gear 20 which can be moved to the right from its neutral position shown in the drawing to mesh with the low-speed gear 17 or may be moved to the left to mesh with an idler 21 that is in constant engagement with the reverse gear 18 on the counter-shaft. The mounting of the gear 20 on the shaft 10 is conveniently effected by the conventional splines 22.

The splines 22 extend for only a part of the length of the main shaft 10, and on the un-splined portion of such shaft there is mounted the second-speed gear 23. The hub 24 of the second-speed gear 23 is provided with a series of internal gear teeth adapted to fit over over the teeth of the pinion 13 to effect a positive driving connection between the pinion and the second-speed gear 23 when such gear is moved to the right from its neutral position illustrated in the drawing. The gear 23 has associated with it a clutch member 25 which is mounted upon the splines 22 of the main shaft 10 and is therefore rotatable with and slidable upon such main shaft. Desirably, the hub of the gear 23 is counterbored for the reception of the clutch member 25 and beyond such clutch member is provided with an internal annular groove for the reception of a split spring ring 26 which bears against the rear face of the clutch member 25. As a result, the clutch member 25 is shiftable axially on the main shaft 10 with the second-speed gear 23.

We contemplate that the clutch member 25 and the second-speed gear 23 will be operatively interconnected through the medium of an overrunning clutch. In its broad aspects, our invention is not limited to any particular form of clutch but we prefer to use a coil-spring clutch of the type illustrated in the co-pending application of William Carleton Starkey, Serial No. 391,272, filed September 9, 1929. With such a clutch, the clutch member 25 and the hub of the gear 23 are provided with alined axial recesses which receive a helical spring 27. When the gear 23 and clutch member 25 tend to rotate relatively in a direction to unwind the spring 27, the spring expands into gripping engagement with the walls of the recesses which receive it and locks the gear 23 and clutch member 25 together. Upon relative rotation in the opposite direction, the spring 27 is collapsed and does not grip the walls of its associated recesses, with the result that the gear 23 and clutch member 25 can rotate relatively in such direction.

For the purpose of shifting the gear 23, it may be provided with an annular groove for the reception of a shifter fork 30 which is rigid with a shifter sleeve 31 slidably mounted upon a rod 32. A similar shifter fork and sleeve may be associated with the gear 20. For the purpose of operating the shifter sleeves to effect axial sliding of the gears 20 and 23, a gear-shift lever 33 of the usual type may be employed. Such a lever is universally mounted in order that it may be brought into engagement with either shifter sleeve and may move such sleeve in either direction.

As shown in the drawing, the gears 20 and 23 are in their neutral positions. The gear-shift lever 33 may be brought into engagement with the shifter sleeve 31 and may be swung in one direction to move the gear 23 to the right to cause engagement with the pinion 13 or may be moved in the opposite direction to cause engagement of the gear 23 with the second-speed gear 16 on the counter-shaft. Normally, in either of these operative positions of the gear 23, it receives power from the engine and transmits it through the overrunning clutch and the clutch member 25 to the main shaft 10 of the transmission, and thence to the drive wheels. As the drive is through the overrunning clutch, the engine under these circumstances cannot act as a brake to impede forward movement of the automobile. When the engine tends to rotate at a speed greater than that corresponding to the speed of the automobile, the clutch member 25 and gear 23 will tend to rotate relatively in the opposite direction, thus unwinding the spring and expanding it into gripping engagement with the walls of its associated recesses to clutch the member 25 and gear 23 together.

As it is frequently desired, particularly when descending long hills, to set the transmission in second-speed and use the engine as a brake, we provide means whereby the gear 23 may be directly and positively clutched to the main shaft 10. This may readily be accomplished by providing in the bore of the gear 23 key-ways 35 adapted to receive the forward ends of the splines 22 upon an abnormal rearward movement of the gear 23. For the purpose of maintaining engagement of the gear 23 with the second-speed gear 16 on the counter-shaft, the latter gear may have a face of extra width, as is clear from the drawing. With this construction, an initial rearward movement of the gear 23 will bring it into mesh with the gear 16, but will not be sufficient in extent to cause engagement of the key-ways 35 with the splines 22. In this position of the gear 23, the action of the overrunning clutch will not be interfered with. Rearward movement of the gear 23 may be continued, however, until the splines 22 are received within the key-ways 35, while the gear 23 still remains in mesh with the gear 16. Under such circumstances, the gear 23 is directly and positively connected to the main shaft 10 of the transmission, and the overrunning clutch is out of action.

Another means of locking the overrunning clutch out of action is illustrated in Fig. 2. Here, instead of providing key-ways in the bore of the gear 23, we extend the hub of such gear rearwardly beyond the clutch member 25 and provide the projecting end of such hub with an internal series of teeth 37 which, upon abnormal rearward movement of the gear 23, come into engagement with a series of external teeth 38 on the hub of the gear 20. As the gear 20 is mounted for rotation with the main shaft 10, engagement of the teeth 37 on the hub of the gear 23 with the teeth 38 on the hub of the gear 20 will lock the gear 23 to the shaft 10, and the overrunning clutch will be out of action.

For the purpose of enabling the operator accurately to control the position of the gear 23, we may provide on the gear shift lever 33 a releasable latch 40 which, when operative, serves to confine the gear shift lever to normal movement and prevents the abnormal movement which is necessary to cause engagement of the key-ways 35 with the spline 22

(Fig. 1) or engagement of the teeth 37 with the teeth 38 (Fig. 2). To this end, we provide in the path of the latch 40 a stop or abutment 41 with which the latch 40 comes into contact before rearward movement of the gear 23 has progressed to such an extent that it is positively connected to the main shaft 20 by either of the means illustrated in the drawing. The latch 40, however, is pivotally mounted and is connected to a push button 42 on the head of the gear shift lever 33 in such a manner that when the push button 42 is depressed, the latch 40 is swung upward out of engagement with the stop 41 to permit the abnormal movement of the gear shift lever 33 which is necessary to cause the locking of the gear 23 to the main shaft 10 of the transmission. Desirably, a spring 43 normally serves to hold the latch 40 in operative position where it will strike the stop 41 to limit movement of the gear-shift lever 33.

As the overrunning clutch we provide is located in the transmission in association with the sliding gear 23, it is out of action except when the transmission is set to provide a drive through such sliding gear. The other sliding gear 20, whether in mesh with the low-speed gear 17 or with the reverse idler 21, operates in the usual manner to effect a positive driving connection.

We claim as our invention:

1. In a change-speed transmission, a countershaft, a main shaft, and a drive shaft coaxial with said main shaft, means for driving said countershaft from said drive shaft, a gear rotatable with said countershaft, a gear rotatable on said main shaft, interengageable clutch means on said main-shaft gear and on said drive shaft, interengageable clutch means on said main-shaft gear and main shaft, a member rotatable with said main shaft, and a unidirectional clutch operatively interconnecting said member and said main-shaft gear, said main-shaft gear being shiftable axially of said main shaft in one direction from a neutral position to engage the clutch means on said drive shaft and in the opposite direction from said neutral position to engage said countershaft gear and, by a continued movement to engage the clutch means on said main shaft.

2. In a change-speed transmission, a shaft, a driven gear rotatable on said shaft, a driving gear, an auxiliary clutch member rotatable with said shaft, unidirectional clutch means operatively interconnecting said driven gear and auxiliary clutch member, and positive clutch means comprising co-acting splines and grooves on said driven gear and shaft respectively for interconnecting said driven gear and said shaft, said driven gear being movable axially of said shaft into mesh with said driving gear and, by a continued movement, engaging said splines and grooves of said positive clutch means.

3. In a vehicle transmission, a second speed effecting gear driven by the vehicle engine, a shaft, a driving member nonrotatably mounted on said shaft, a gear member rotatably mounted on said shaft, an overrunning clutch connecting said driving member and rotatable gear, and means for shifting said driving member axially in one direction from a neutral position to progressively effect first an overrunning drive between said second speed gear and said shaft and then a positive drive between said gear and shaft.

4. In a vehicle transmission, a gear driven by the vehicle engine, a shaft, a driving member nonrotatably and slidably mounted on said shaft, a gear member rotatably mounted on said shaft, an overrunning clutch connecting said driving member and rotatable gear, and means for shifting said driving member axially in one direction from a neutral position to progressively effect first an overrunning drive between the positively driven gear and said shaft and then a positive drive between said gear and shaft.

5. In a vehicle transmission, a reduced speed effecting gear driven by the vehicle engine, a shaft, a driving member nonrotatably and slidably mounted on said shaft, a gear member rotatably mounted on said shaft, an overrunning clutch connecting said driving member and rotatable gear, and means for shifting said driving member axially in one direction from a neutral position to progressively effect first an overrunning drive between said reduced speed gear and said shaft and then a positive drive between said gear and shaft.

6. In a vehicle transmission, a reduced speed gear driven by the vehicle engine, a splined shaft, a correspondingly splined driving member slidably mounted on said shaft, a gear member rotatably mounted on said shaft, an overrunning clutch connecting said driving member and rotatable gear, and means for shifting said driving member axially in one direction from a neutral position to progressively effect an overrunning drive between said reduced speed gear and said shaft and then a positive drive between said gear and shaft.

7. In a vehicle transmission, a reduced speed gear driven by the vehicle engine, a splined shaft, a correspondingly splined driving member slidably mounted on said shaft, a member rotatably mounted on said shaft and held in axial alignment with said driving member, an overrunning clutch connecting said driving member and rotatable member, and means for shifting said overrunning clutch and rotatable member and driving member axially as a unit in one direction from a neutral position to progressively effect first an overrunning drive and then a positively drive between said reduced speed gear and said shaft.

In witness whereof, we have hereunto set our hands at Indianapolis, Indiana, this 26th day of February, A. D. one thousand nine hundred and thirty.

WILLIAM CARLETON STARKEY.
CLARENCE H. BARTON.